United States Patent
Boneberg et al.

(10) Patent No.: US 6,299,853 B1
(45) Date of Patent: Oct. 9, 2001

(54) METHOD AND APPARATUS FOR OPERATING A REFORMER/CO OXIDATION UNIT

(75) Inventors: Stefan Boneberg, Beuren; Stefan Brauchle, Biberach/Riss; Dirk Georg, Kirchheim/Nabern; Joachim Guertler, Weilheim/Teck; Martin Schaefer, Kirchheim; Martin Schuessler, Ulm; Matthias Wolfsteiner, Alesheim, all of (DE)

(73) Assignee: Xcellsis GmbH, Kirchheim/Teck-Nabern (DE)

( * ) Notice: Subject to any disclaimer, the term of this patent is extended or adjusted under 35 U.S.C. 154(b) by 0 days.

(21) Appl. No.: 09/417,484

(22) Filed: Oct. 13, 1999

(30) Foreign Application Priority Data

Oct. 13, 1998 (DE) .............................................. 198 47 211

(51) Int. Cl.$^7$ .............................. C01B 3/26; C01B 31/18; B01J 8/04
(52) U.S. Cl. ........................ 423/652; 252/373; 422/110; 422/172; 422/173; 422/190; 422/198; 423/418.2; 423/437.2
(58) Field of Search ............................. 423/418.2, 437.2, 423/648.1, 650, 651, 652; 422/171, 172, 173, 190, 198, 110; 252/373

(56) References Cited

U.S. PATENT DOCUMENTS 6,096,286 * 8/2000 Autenrieth ............................ 423/651

FOREIGN PATENT DOCUMENTS

| | | |
|---|---|---|
| 195 44 895 | 2/1997 | (DE) . |
| 197 27 589 A1 | 1/1999 | (DE) . |
| 0 743 694 A1 | 11/1996 | (EP) . |
| 0 833 401 A2 | 4/1998 | (EP) . |
| 0 834 948 | 4/1998 | (EP) . |
| 08047621 A | 2/1996 | (JP) . |
| 08133702 A | 5/1996 | (JP) . |
| 08157201 A | 6/1996 | (JP) . |

OTHER PUBLICATIONS

D. Dindeleux, L. Sideriades: "Technique de la Regulation Industrielle," 1986, Eyrolles, Paris XP002127052, p. 112, Fig. 4.2.

* cited by examiner

Primary Examiner—Steven P. Griffin
Assistant Examiner—Maribel Medina
(74) Attorney, Agent, or Firm—Crowell & Moring LLP

(57) ABSTRACT

A system for generating hydrogen-rich gas has a reformer for catalytic water vapor reforming of a water vapor/fuel mixture by an input supply of thermal energy, and a CO oxidation stage for removing carbon monoxide from the hydrogen-rich gas while emitting heat, with the reformer and the CO oxidation stage being thermally coupled. An oxygen quantity fed to the CO oxidation stage is adjusted as a function of the gas temperature in or at the output of the reformer/oxidation stage. This can take place by an automatic (feedback) control, a combination of open loop control and automatic control or by an adaptive characteristic diagram.

8 Claims, 1 Drawing Sheet

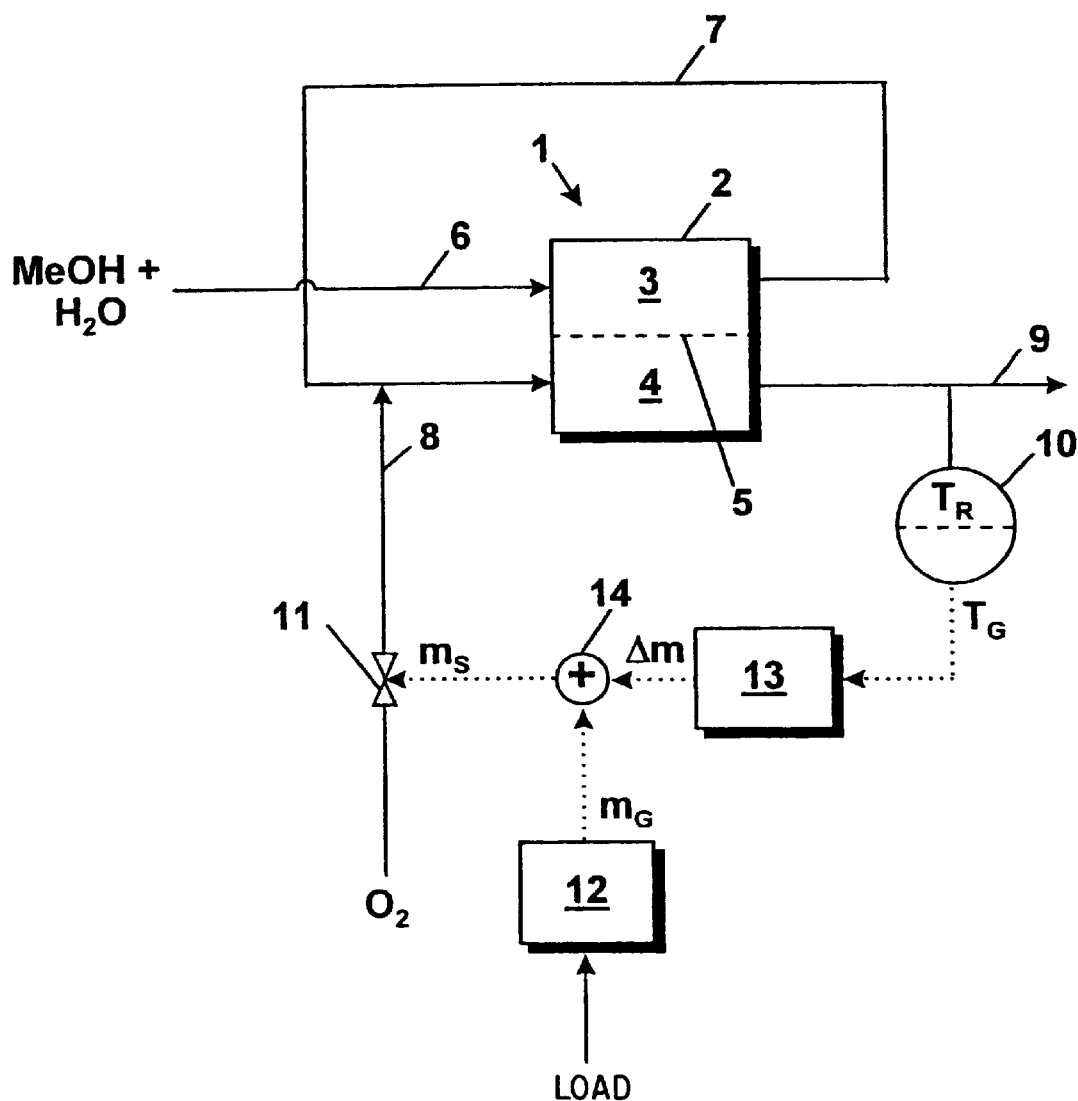

METHOD AND APPARATUS FOR OPERATING A REFORMER/CO OXIDATION UNIT

BACKGROUND AND SUMMARY OF THE INVENTION

This application claims the priority of German patent document 198 47 211.4, filed Oct. 13, 1998, the disclosure of which is expressly incorporated by reference herein.

The invention relates to a method and apparatus for operating a system for generating hydrogen-rich gas by reformation of a hydrogen containing fuel.

Unpublished German patent application by the applicant (File Number DE 197 27 589.3) describes a system for generating hydrogen-rich gas which includes a reformer for catalytic water vapor reforming of a water vapor/fuel mixture while feeding thermal energy, and a CO oxidation stage for selective catalytic oxidation of carbon monoxide from the hydrogen-rich gas while supplying heat, the reformer and the CO oxidation stage being thermally coupled. The oxygen, which is required for the selective catalytic oxidation in the CO oxidation stage, is either fed directly into the gas feed pipe or is fed directly into the CO oxidation stage. The quantity of fed oxygen is adjusted such that an atomic ratio of CO to O occurs which is between approximately 1:1 and 1:4.

It is an object of the present invention to provide a method for operating a system for generating hydrogen-rich gas in which utilization of the reforming catalyst can be improved over the whole load range and also for the entire useful life.

This and other objects and advantages are achieved by the method and apparatus according to the invention, in which the fed oxygen quantity is controlled based on the temperature in or at the output of the reformer/CO oxidation stage. In this manner, it can be ensured that the reforming catalyst is operated with a good utilization over the whole load range; that is, as the result of the fed oxygen quantity, the reaction rate in the CO oxidation stage and thus the amount of heat fed to the overall system is adjusted. By way of this control circuit, the temperature in the reformer/CO oxidation stage is kept at a defined value so that the reaction can take place independently of load changes or aging phenomena under optimal conditions.

By adjusting the oxygen quantity by means of a controlled basic quantity and an additional differential pressure control by means of the gas mixture quantity, control expenditures can be reduced.

Other objects, advantages and novel features of the present invention will become apparent from the following detailed description of the invention when considered in conjunction with the accompanying drawings.

BRIEF DESCRIPTION OF THE DRAWINGS

The FIGURE shows a system for water vapor reformation of a hydrogen rich fuel according to the invention.

DETAILED DESCRIPTION OF THE DRAWINGS

Referring to the Figure, the reformer/CO oxidation stage, which as a whole has the reference number 1, consists of a common housing 2 in which a system 3 for the catalytic water vapor reforming of a water vapor/fuel mixture (a "reformer") and a system 4 for the selective catalytic carbon monoxide oxidation (a "CO oxidation stage") are integrated. The reformer/CO oxidation stage 1 is constructed as a heat exchanger, with a heat exchange surface 5 provided between the reformer 3 and the CO oxidation stage 4. Arbitrary hydrocarbon-containing starting substances can be used as fuel. The following embodiment will be explained by means of an example in which methanol is used as the fuel.

A gaseous water vapor/methanol mixture is fed to the reformer 3 by way of a feed line 6. After flowing through the reformer 3, the reformate is then guided by way of a reformate feed line 7 directly into the CO oxidation stage 4.

Preferably, the reformate feed line 7 is constructed such that water vapor/methanol mixture and the reformate flow in parallel through the reformer 3 and the CO oxidation stage 4. In addition, it can be provided that the reformer 3 has several reaction chambers; that the CO oxidation stage 4 has several purification chambers; and that the reaction and purification chambers 3, 4 are arranged in an alternating manner and are in each case in a mutual thermal contact by way of a common heat exchange surface 5. However, in addition to such plate arrangements, tube bundle arrangements are also suitable.

In addition, by way of an oxygen line 8, an oxygen-containing gas—preferably air—is fed to the CO oxidation stage 4. This can take place either, as illustrated in the embodiment, into the reformate feed line 7 or directly into the CO oxidation stage 4 or by way of several apportioning points distributed along the reactor length. After the flow through the CO oxidation stage 4, the purified reformate is then fed by way of another line 9 directly to a fuel cell, which is also not shown, or to one or several additional gas purification stages.

During catalytic water vapor reforming of methanol, a mixture of methanol and water vapor is heated and converted to hydrogen using a suitable catalyst, and carbon dioxide is formed simultaneously:

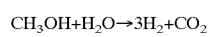

or

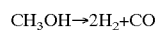

In mobile applications, for example, in the case of the water vapor reforming for fuel cells in motor vehicles, it is important that the required yield of hydrogen gas can be made available while the space requirement and the weight are as low as possible. Because the reaction takes place only while heat is supplied, however, the yield is dependent on the heat supply. For this reason, the reactor must be constructed such that an optimal heat transfer is ensured from a provided heat source to the reform gas and to the catalyst material.

The CO oxidation stage 4 is used for removing carbon monoxide CO from the $H_2$-rich gas generated in the reformer 3 by means of selective catalytic oxidation. After a corresponding purification, this so-called reformate, which consists, for example, of hydrogen with a CO fraction of 0.5–3% by volume, is preferably used for the mobile use of PEM fuel cells in vehicles. During the selective catalytic oxidation, oxygen (for example, in the form of ambient air) is added to the reformate by way of the oxygen line 8, in which case then the carbon monoxide CO is oxidized by the oxygen $O_2$ to carbon dioxide $CO_2$. This reaction is carried out at a suitable oxidation catalyst, for example, platinum and/or ruthenium on a suitable carrier, such as $Al_2O_3$ or a zeolite in powder form.

Since selective catalytic oxidation is a highly exothermal reaction, the energy released in the CO oxidation stage 4 and transmitted to the reformer 3 by means of the heat exchange surface 5 is sufficient for a complete heating of the reformer 3. The reaction rate in the CO oxidation stage 4 can be controlled by adjusting the quantity of fed oxygen. If more oxygen is fed, more CO or optionally also hydrogen or unconverted methanol is oxidized in the CO oxidation stage 4. As a result, more thermal energy is generated in the CO oxidation stage 4 and is transmitted by way of the heat exchange surface 5 to the reformer 3, so that the temperature rises there. If, in contrast, less oxygen is charged into the CO oxidation stage 4, the reaction rate is reduced and therefore also the temperature in the reformer 3.

By means of the temperature $T_G$ of the gas mixture flow, a closed control loop can therefore be implemented for the fed oxygen quantity $m_s$. The temperature $T_G$ is measured at one or several points in (or preferably also at the output of) the reformer/CO oxidation stage 1. In the embodiment, a temperature sensor 10 is provided for this purpose in the line 9. As a function of this measured temperature $T_G$, the fed oxygen quantity $m_s$ can then be adjusted and therefore the temperature $T_R$ in the reformer/CO oxidation stage 1 can be controlled to a defined desired value $T_s$.

In the embodiment, the adjusting of the temperature $T_G$ is implemented by a combination of open loop control and automatic (closed loop) control. The fed oxygen quantity $m_s$ is adjusted by a valve 11 arranged in the oxygen line 8, which is controlled on the one hand by means of a load-dependent characteristic diagram and, on the other hand, by means of a control algorithm as a function of the measured temperature $T_G$. For this purpose, in each case, as a function of the current load, a basic quantity $m_g$ for the oxygen to be supplied is read out of a characteristic diagram—schematically illustrated as block 12. In addition, from the measured temperature $T_g$, by means of a control algorithm —schematically illustrated as block 13—a differential quantity $\Delta m$ for the oxygen to be supplied is determined. For the automatic control, each suitable control algorithm, such as a so-called PID controller, can be used. In a summation point 14, the two values $m_g$ and $\Delta m$ are added and are transmitted to the valve as an oxygen quantity to be fed $m_s = m_G + \Delta m$. In this case, $\Delta m$ may also assume a negative value if the temperature $T_G$ measured by means of the temperature sensor 10 is too high.

The oxygen quantity $m_s$ to be fed can, for example, be made available from the characteristic diagram 12 or from the control algorithm 13 as a mass flow. In this case, this mass flow must then be converted by a control system (not shown) of the valve 11 into a suitable control signal. When a solenoid valve is used, this would correspond, for example, to the timing frequency.

This combination of the open loop control and automatic (closed loop) control has the advantage that the essential portion of the oxygen quantity $m_s$ to be fed is defined by the open loop control, while the automatic control must compensate only deviations $\Delta m$ caused by load or aging. This reduces the control expenditures. However, in principle, it is also possible to adjust the entire oxygen quantity $m_s$ by way of an automatic control. Furthermore, it is conceivable to determine the oxygen quantity $m_s$ to be fed exclusively by means of an adaptive characteristic diagram. In this case, the measured temperature $T_G$ would be used for adapting the values in the characteristic diagram 12.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a reformer/CO oxidation stage for generating hydrogen-rich gas, which reformer/CO oxidation stage includes a reformer which uses input heat for catalytic water vapor reforming of a gaseous water vapor/fuel mixture, a CO oxidation stage for the catalytic oxidation of carbon monoxide from the hydrogen-rich gas while emitting heat, and devices for transmitting thermal energy from the CO oxidation stage into the reformer, upstream of or in the CO oxidation stage, a quantity oxygen-containing gas being fed in a defined quantity ($m_s$) to the gas mixture flow into the CO oxidation state, said method comprising:

measuring a temperature of the gaseous water vapor/fuel mixture at at least one point which is within or at an output of the reformer/CO oxidation stage; and adjusting said quantity of the fed oxygen-containing gas as a function of said measured temperature.

2. Method according to claim 1, wherein said adjusting step comprises:

defining a basic quantity for the oxygen-containing gas to be fed, by means of a load-dependent characteristic diagram; and based on said basic quantity, adjusting said temperature to a desired temperature value by means of an automatic differential quantity control.

3. Method according to claim 1, wherein the quantity of fed oxygen-containing gas is automatically controlled as a function of said temperature.

4. Method according to claim 1, wherein the quantity of fed oxygen containing gas is controlled by using a load-dependent characteristic diagram which is accessed based on the temperature.

5. Apparatus for generating a hydrogen rich gas, comprising:

a reformer/CO oxidation stage comprising a reformer for catalytic water vapor reformation of a gas flow comprising a water/vapor fuel mixture, a CO oxidation stage for exothermic catalytic oxidation of carbon monoxide from an output hydrogen rich gas flow from said reformer stage and means for transferring heat from the exothermic catalytic oxidation in said CO oxidation stage to said catalytic water vapor reformation in said reformer stage;

a supply line for providing a flow of a quantity of oxygen-containing gas to said CO oxidation stage;

means for measuring temperature of gas flow at at least one point which is within or at an output of said reformer/CO oxidation stage, and means for adjusting said quantity of oxygen-containing gas, at least as a function of said measured temperature.

6. Apparatus according to claim 5, wherein said means for adjusting comprises a feedback loop for adjusting said quantity of oxygen-containing gas as a function of a deviation of said measured temperature from a preset temperature.

7. Apparatus according to claim 6, further comprising means for setting a basic quantity of said oxygen-containing gas flow as a function of an operating load supplied by said reformer stage, said basic quantity being added to a differential quantity generated by said feedback loop.

8. Apparatus according to claim 7, wherein said means for setting a basic quantity comprises a look up table which is accessed according to said load.

* * * * *